United States Patent [19]
Hawkins et al.

[11] Patent Number: 5,384,805
[45] Date of Patent: Jan. 24, 1995

[54] RF COMMUNICATION SYSTEMS IN OPEN ARCHITECTURE BUS LINES

[75] Inventors: Steve K. Hawkins, Plano; Bruce R. Whitney, Terrell, both of Tex.

[73] Assignee: E-Systems, Inc., Dallas, Tex.

[21] Appl. No.: 959,258

[22] Filed: Oct. 9, 1992

[51] Int. Cl.⁶ .................................... H04B 1/38
[52] U.S. Cl. ............................ 375/7; 375/8; 375/36; 375/121; 370/85.1
[58] Field of Search ........................ 375/7–9, 375/121, 36; 370/57, 69.1, 85.1, 85.9, 124; 340/825.5, 825.52; 364/130, 131, 138, 178, 179, 188

[56] References Cited

U.S. PATENT DOCUMENTS

| | | | |
|---|---|---|---|
| 4,580,276 | 4/1986 | Andruzzi, Jr. et al. | 375/9 |
| 4,637,035 | 1/1987 | Betts | 375/8 |
| 4,845,707 | 7/1989 | Isaacson et al. | 370/69.1 |
| 5,239,538 | 8/1993 | Teel, Jr. et al. | 370/85.1 |

*Primary Examiner*—Stephen Chin
*Assistant Examiner*—Don Vo
*Attorney, Agent, or Firm*—Harold E. Meier

[57] ABSTRACT

A system for RF communications utilizing an open architecture bus line is disclosed. The system consists of a single-board receiver exciter, a single-board modulator and a system control processor all interfaced to a standard bus line. All three units are implemented on single-board assemblies and are programmable to perform over a variety of frequency ranges, to operate at one of a variety of modulating schemes, and to utilize varying data rates.

20 Claims, 7 Drawing Sheets

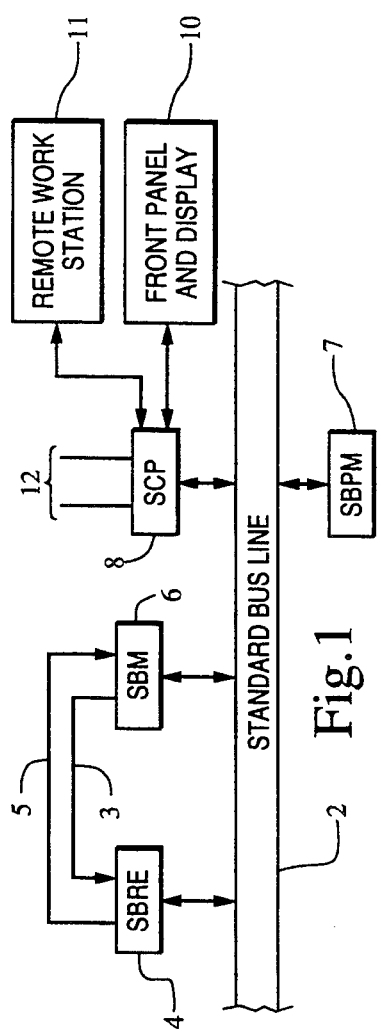
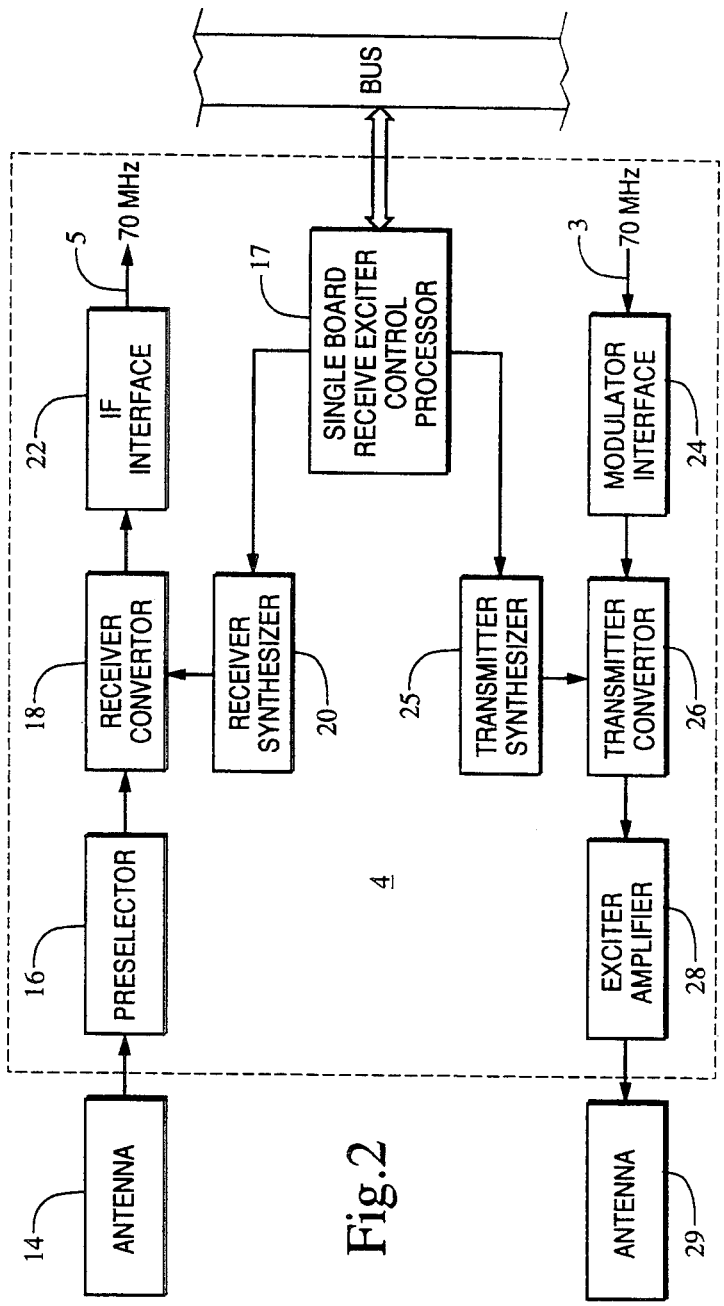

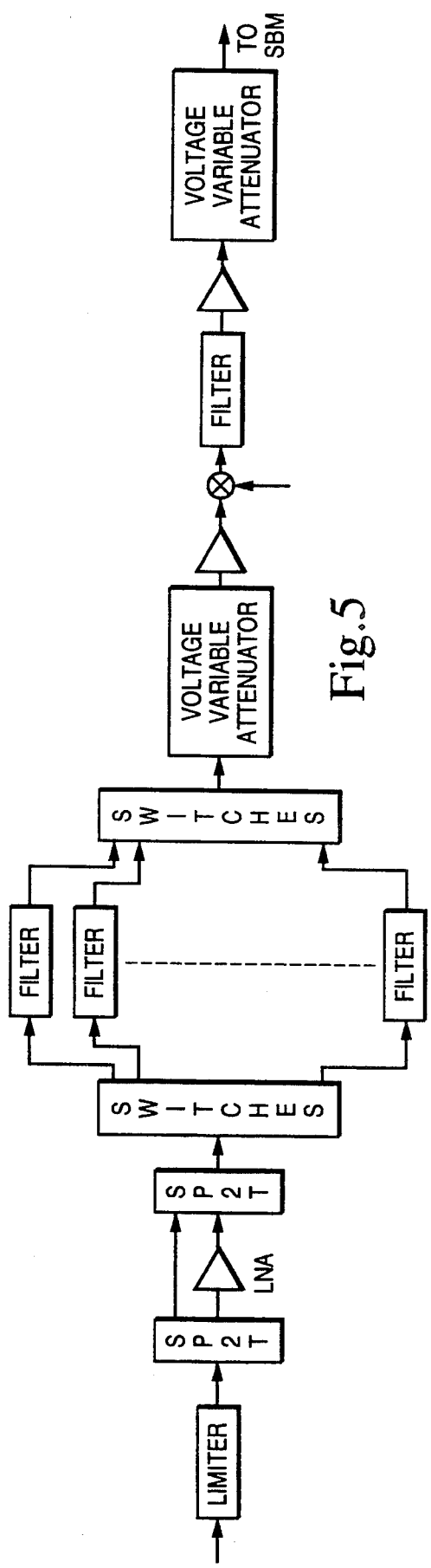
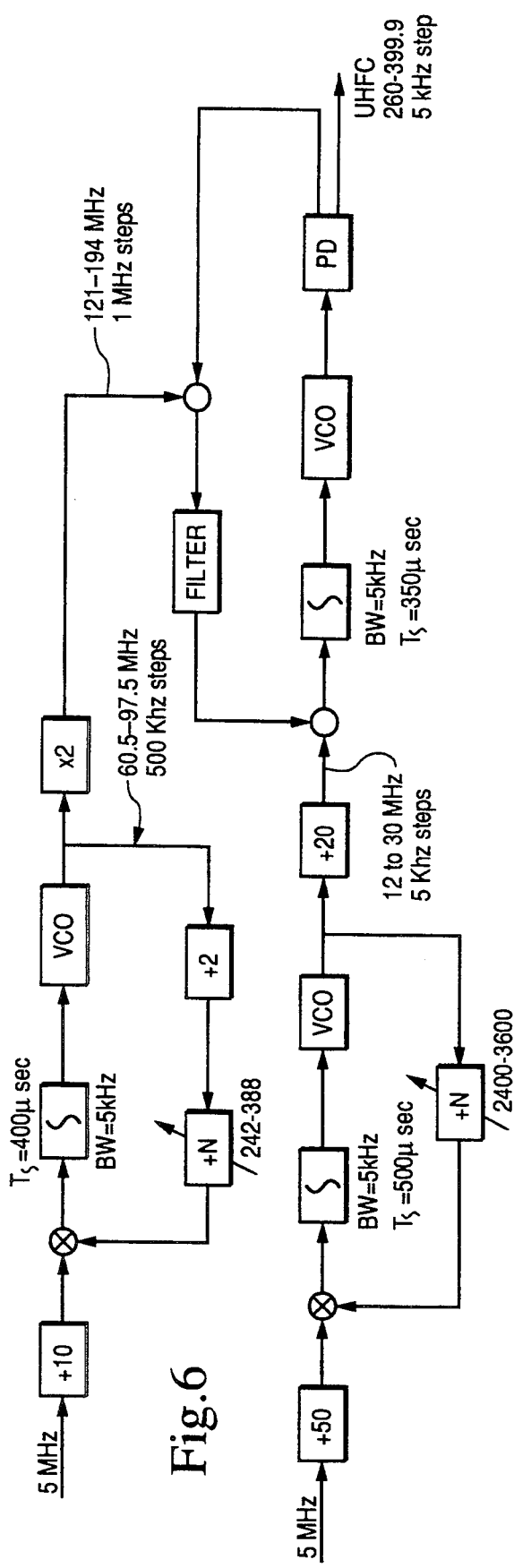
Fig.5
Fig.6

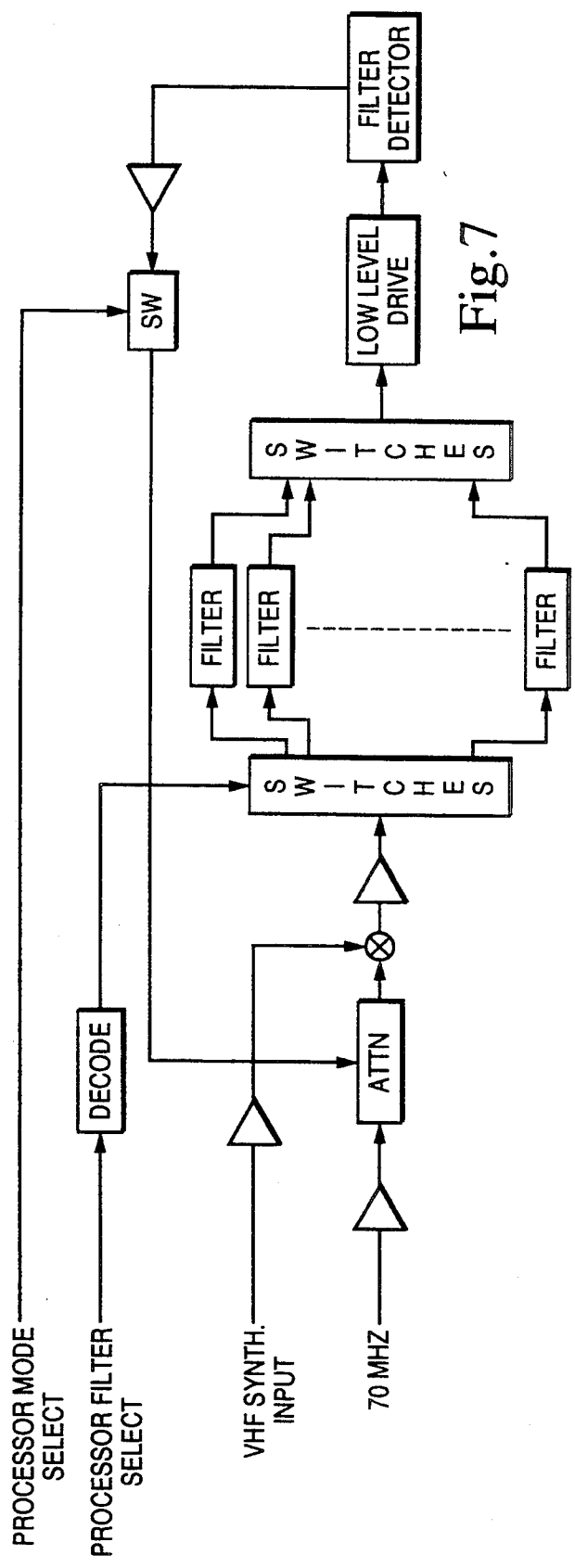
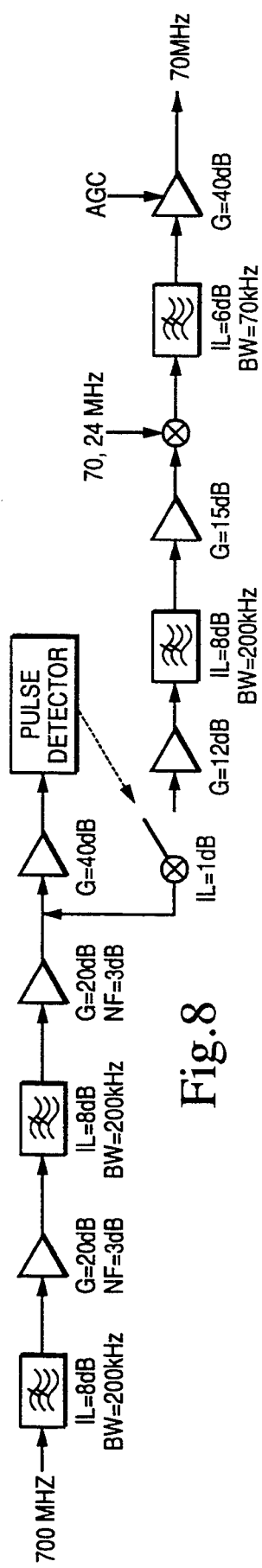
Fig.7
Fig.8

RF COMMUNICATION SYSTEMS IN OPEN ARCHITECTURE BUS LINES

TECHNICAL FIELD

This invention relates to RF communication systems, and more particularly to the application of RF communication systems to an open architecture bus configuration.

BACKGROUND OF THE INVENTION

Most present communication systems are based upon box level designs. The receiver/exciter and modulation units consist of several box units contained within a rack structure taking up a great deal of space. Typically, each box unit performs only a single designated function.

Box level designs are undesirable because each box unit may not be reconfigured to perform additional functions. Thus, in order to upgrade the capabilities of the communications system, one or more box unit must be added to the existing hardware. Present approaches further require that additional upgrades be customized within a new box unit to be added to the existing hardware. However, the addition of more box units to upgrade the system requires the use of additional rack space which may not be available in the rack structure.

A box unit based system also creates extensive cabling problems. Whenever a new box is added to the system, new cabling must be added for the box. If several new boxes are added, the problems involved with running additional cable to the boxes may include moving existing unit structures to make room for the cabling pathway, individually cabling each box into the system and overcoming problems associated with the differing box interfaces. The fact that each box is individually cabled into the system also prevents extensive system remodification from being easily carried out because of the time required for recabling and rack modification.

Present box level design systems also limit the operation of existing box units to a single type of function. If a box unit should become disabled while in operation and spare units are not available, the system cannot be easily reconfigured to accommodate the failed unit. The lack of flexibility in present systems also causes extensive down time while reconfiguration of the communication system takes place.

Thus, a need has arisen for a communication system offering flexible operating parameters and having fewer cabling and spacing problems than are associated with presently existing box level design systems.

SUMMARY OF THE INVENTION

The present invention overcomes the foregoing and other problems by using an open architecture based communications systems. The invention consists of a single board receiver exciter (SBRE), a single board modem (SBM) and a system control processor (SCP). Each of these units is capable of plugging into a standard bus architecture such as a VME bus or future bus. Instead of requiring an entire box unit for each of the above-mentioned assemblies, the units are implemented on single 6 U or 9 U cards. Thus, the space requirements for a communication system utilizing the above assemblies is drastically reduced from that needed in the prior art box level design systems.

The configuration of the SBRE and SBM boards allow for the flexible and adaptable operation of the communication system. The boards may be programmed as required by the system operator to operate at a variety of frequency levels such as UHF, SHF, VHF, etc. Also, the boards are capable of operating at a variety of modulation schemes and bit rates according to operation selection. The flexibility and adaptability of the present system is achieved by implementing many functions of a receiver/exciter and modem normally implemented by hardware elements using software elements. Programming and control commands for implementing and changing between the plurality of functions (frequencies and modulations) are sent to the board units over the standard bus architecture.

The SBRE consists on the receiver side of a preselector, converter, synthesizer, and IF interface. On the transmitter side are the exciter/amplifier, converter, synthesizer and modulator interface. A controller processor connected to the transmitter and receiver sides allows for control of the board components over the standard bus interface. The modulator/demodulator and decoder/encoders of the SBM are implemented in software allowing for change of the type of modulation and the bit rates of the SBM in response to commands received over the standard bus interface.

A single board processor/multiplexer SBPM may also be used within the communications system to operate as a multifunctional communications device. The SBPM is a programmable device capable of operating in a multiplexing mode, a controller mode, and an intelligent input/output interface mode. The SBPM may be programmed via instruction from the bus line over a standard bus interface.

Reprogramming of the system software is achieved by means of a keyboard and display panel locally attached to the bus architecture or over a remote work station connected by a network. The SCP is responsible for controlling the command data flow along the standard bus between the SBM and the SBRE and for monitoring the status of the boards during operation of the system and for facilitating operation control of the keyboard and display panel.

BRIEF DESCRIPTION OF THE DRAWINGS

For a more complete understanding of the present invention and the advantages thereof, reference is now made to the following detailed description taken in conjunction with the accompanying drawings in which:

FIG. 1 is a block diagram illustrating the system architecture of the present invention;

FIG. 2 is a block diagram illustrating the structure of the single-board receiver exciter of the present invention;

FIG. 5 is a block diagram illustrating the preselector of the single board receiver exciter;

FIG. 6 is a block diagram illustrating the receiver and transmitter synthesizers of the single board receiver exciter;

FIG. 7 is a block diagram illustrating the exciter amplifier of the single board receiver exciter;

FIG. 8 is a block diagram illustrating the IF portion of the single board modulator;

DETAILED DESCRIPTION OF THE INVENTION

Figure 3:
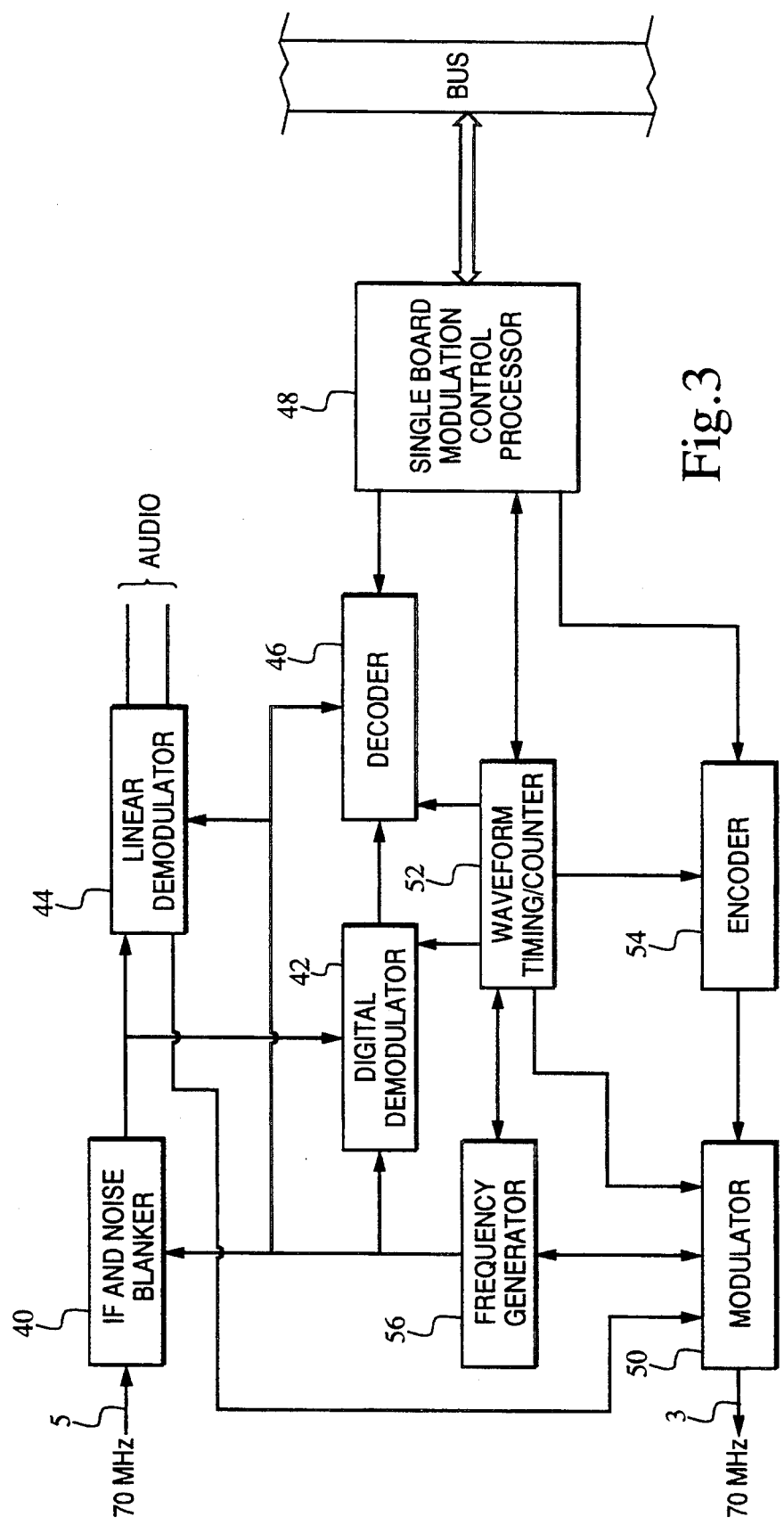
FIG. 3 is a block diagram illustrating the structure of the single-board modem of the present invention.

Referring now to FIG. 1, there is shown an illustration of the open architecture system of the present invention. The system operates off any standard bus line architecture such as a VME or future bus. Connected to the bus 2 are a single-board receiver/exciter (SBRE) 4, a single board modem (SBM) 6, a system controller processor 8 and a single board processor/multiplexer (SBPM) 7. Each unit is implemented on a single 6 U or 9 U card. The system provides expansion flexibility because additional SBRE 4 and SBM 6 boards may be added to increase the capabilities of the system or the boards may be reprogrammed to perform other functions as will be described in more detail herein. Communications between the SBRE 4 and SBM 6 occur over two IF transmission lines 3 and 5.

The SBRE 4 is the RF processing center of the system. This board provides full duplex communication capabilities and covers a variety of frequency ranges depending on how the SBRE 4 is programmed by the system operator during system initialization. The SBM 6 is a multi-purpose, multi-media modem. The majority of the modulation and encoding functionality of the SBM is processed using a software based design. This allows for a high degree of flexibility for the SBM 6 in the modulation type and signal rate utilized by the system.

The system control processor 8 is responsible for the downloading of instructions to the SBRE 4 and the SBM 6 during system initialization and for controlling the boards during system operation. The instructions loaded into the SBRE 4 and the SMB 6 control how the system will operate. The instructions may be passed by the system operator to the processor 8 via communications line 12 or remotely interfaced via a network connection from a remote work station 11.

Referring now to FIG. 2, there is shown a block diagram of the SBRE 4 of the present invention. The signal to the receiver side of the SBRE 4 is input from an external antenna 14. From the antenna 14, the signal passes to a preselector 16. In the preselector 16 (as shown in FIGS. 2 and 5), the signal is amplified and passed through a bank of band-pass filters to remove unwanted noise and distortion. The preselector 16 consists of an input amplifier stage, an input filter switch, a bank of band-pass filters, an output switch, and an output amplifier and mixer. The input amplifier is a switchable low-noise amplifier having approximately 16 dB of gain and a noise figure of 2 dB. The input filter switch is a pin diode using GaAs technology to achieve a low-loss and high-dynamic range. The filter bank is a series of separate 8 pole, lumped element filters. Each filter has a bandwidth of 35 MHz and the filters are centered on 35 MHz incremental spacing starting at 242 MHz. The output switch is identical to the input switch. The tuning of the preselector is completed by the selection of the proper preselector filter in response to a signal from a single-board receiver exciter control processor (SBRECP) 17.

After the amplification and filtering of the signal by the preselector 16, the signal passes to a receiver converter 18. At the receiver converter 18, the signal is mixed with an oscillator signal from a receiver synthesizer 20 (as shown in FIGS. 2 and 6) to convert the receive signal to a 70 MHz IF signal for transmission to the SBM 6. The receiver converter 18 is a high dynamic range and high isolation double balanced mixer. The output of the mixer is filtered and transmitted to the SBM 6 via line 5 by means of an IF interface 22.

On the transmitter side of the SBRE 4, a 70 MHZ IF modulated signal is received from the SBM 6 via line 3 by means of a modulator interface 24. The signal received on line 3 is mixed with an oscillator signal generated by a transmitter synthesizer 25 in a transmitter converter 26 to translate the 70 MHz IF modulated received signal to the desired output frequency range. The construction of the transmitter converter 26 is the same as that of the receiver converter 18.

The signal then passes to an exciter amplifier 28 (as shown in FIGS. 2 and 7) where a bank filter scheme similar to the filters of the preselector 16 removes spurious mixing products and harmonics from the signal and amplifies the signal for RF transmission. The exciter amplifier 28 is essentially the same circuitry used in the preselector 16 except that a monolithic amplifier chain follows the output filter switch to amplify the signal for RF transmission.

The receiver and transmitter synthesizers (20 and 25) used in the SBRE 4 generate the oscillator signals sent to the transmitter and receiver converters 26 and 18. The receiver synthesizer 20 converts the received signal into a 20 MHz IF signal or according to operator selection. The transmitter synthesizer converts IF signal receiver over line 5 into variable transmission frequencies as selected by the system operator. The synthesizers are controlled (frequency and bandwidth) by the SBRECP 17. The SBRE synthesizers as shown in FIG. 6 have a multi-looped phase lock indirect synthesizer configuration with three dependent loops enabling rapid tuning while providing very low phase and spurious outputs. The synthesizer output covers a range of 260-399.995 MHz in 5 KHz increments.

The main purpose of the SBRECP software is to process commands received over the bus interface 19 to control the operating modes and frequencies of the SBRE 4. The SBRECP 17 receives commands from the system control processor 8 to establish the transmit and receive frequencies of the system by affecting the operation of the synthesizer 20 and 25, the power amplifier settings and the antenna switch selections to be used by the synthesizer. The SBRECP 17 controls the filter selection within the preselector 16 and exciter/amplifier 28 to achieve the desired filtering characteristics. Also, the SBRECP 17 tunes the receiver and transmitter synthesizers (20 and 25) to generate oscillator frequencies necessary to achieve the output frequencies designated by the SCP 8. The software within the SBRECP 17 controls the processing commands received over the standard bus interface to control the filters used by the SBRE 4 and the frequencies the synthesizers are tuned to. In addition, the SBRECP 17 will receive commands requesting the status of the SBRE 4 to which the software must respond.

Referring now to FIG. 3, there is shown a block diagram of the SBM 6 of the present invention. The SBM 6 is responsible for modulation/demodulation and decoding/encoding of data transmitted and received over the system. Many elements of the SBM 6 are software driven to support flexibility of modulation and processing rates.

IF signals from the SBRE 4 are input to the SBM 6 via line 5 at an IF and noise blanker 40. The IF and noise blanker 40 converts the 70 MHz IF signal from the SBRE 4 to a 240 KHz IF signal. The IF and noise blanker 40 also amplifies the IF signal while blanking out and filtering undesired noise from the signal. After amplification and conversion to a 240 KHz IF signal, the signal is passed to a digital demodulator 42 and a linear demodulator 44.

Figure 9:
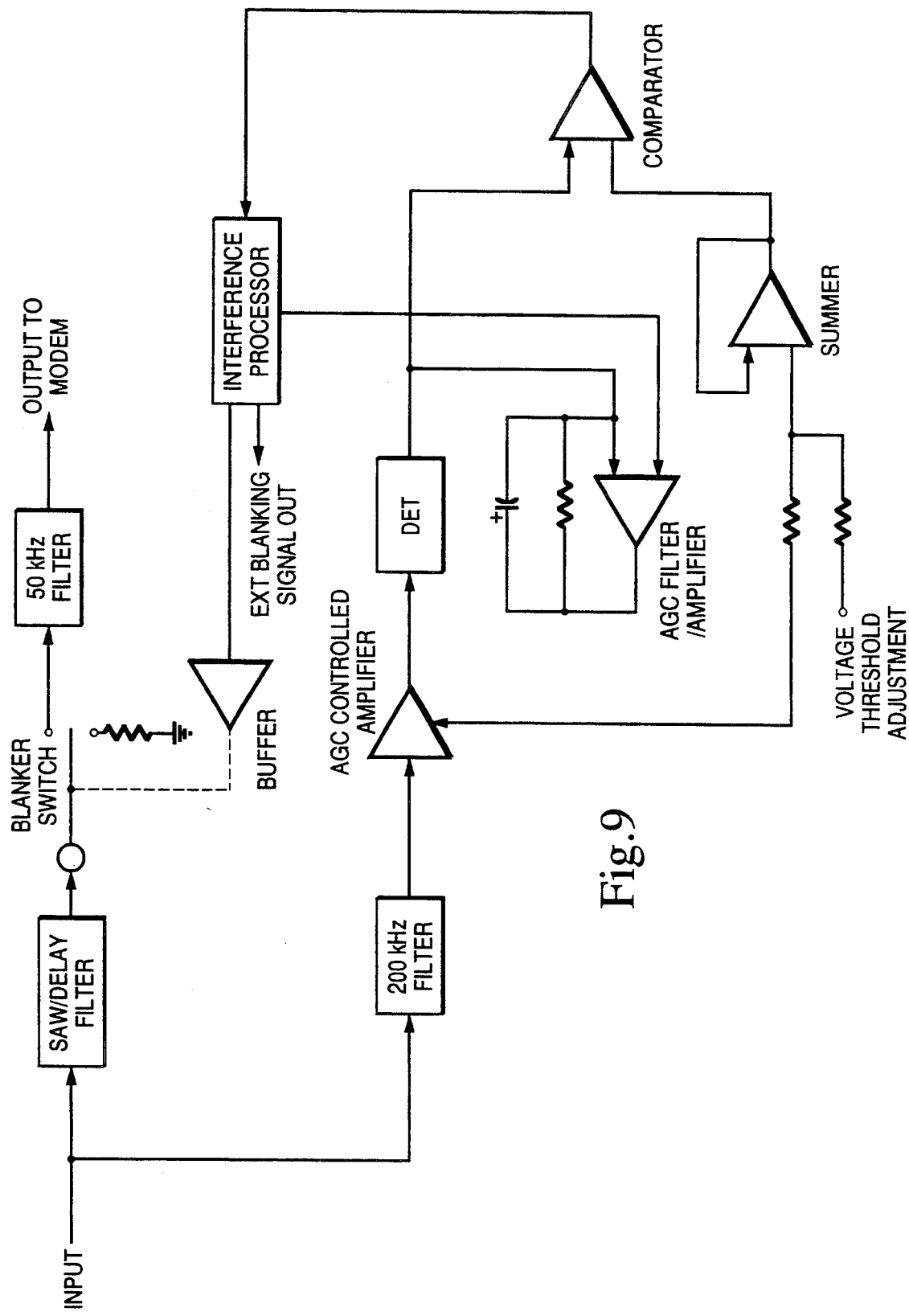
FIG. 9 is a block diagram illustrating the noise blanker portion of the single board modem.

The IF portion shown in FIG. 8 of the IF and noise blanker 40 incorporates a series of monolithic amplifiers which do not require tuning. The filter structure employed is a combination of SAW and crystal filters. The SAW filters have Gaussian pass-band characteristics and approximately 200 KHz pass band. The crystal filter establishes a narrow noise bandwidth for the follow-on demodulator process. The narrow bandwidth is required to prevent spectral noise components from lowering the effective processing signal to noise ratio within the demodulator processing bandwidth. The noise blanker portion shown in FIG. 9 uses a combination of SAW filters and delay lines to eliminate both CW and pulse interferers.

The digital demodulator 42 is implemented by means of a TMS320C30 digital signal processor. A majority of the digital demodulator 42 functions are implemented in software allowing flexibility in the type of demodulation applied to the incoming signal. The software may be changed by the system operator to allow different types of modulating schemes to be carried out such as binary phase shift key, differential quadature phase shift key, etc. The software implementation also allows the use of programmable processing rates to meet different system requirements.

The demodulator accepts digital data from an A/D converter and passes it through a digital formulation of a Costas suppressed carrier tracking loop in an in-phase/mid-phase bit synchronizer for demodulation. After demodulation, the signal is sent to a decoder 46 where decoding and deinterleaving of the signal is carried out. The decoder 46 is a i960CA RICS digital signal processor. The software in the processor of the decoder 46 uses a straight-forward implementation of the Viterbi convolutional decoding algorithm to decode and deinterleave the signal after demodulation.

Audio signals received from the SBRE 4 as 70 MHZ signals on line 5 are passed to the linear demodulator 44. The linear demodulator 44 accepts both AM and FM modulation formats. The design uses a monolithic amplifier and synchronous demodulation integrated circuit to emulate AM and FM detectors.

Once demodulated and decoded, the signal is sent to a SBM control processor (SBMCP) 48. The demodulated and decoded signal is now under control of the software residing in the SBMCP 48. The digital signal processing associated with modulation, demodulation and convolutional coding of signals is under the direct control of the SBM control software. The SBMCP 48 is responsible for higher levels of signal timing. The SBMCP 48 tracks master timing and notifies a processor of a modulator 50 and demodulator 42 of upcoming events. The SBMCP 48 is also responsible for controlling communications between the SBM 6 and the standard bus line. The SBMCP 48 provides signal timing by means of a signal timing and counter circuitry 52. This circuitry 52 properly times the modulation and encoding processes of the SBMCP 48.

The SBMCP 48 receives instructions over the standard bus interface for implementing the proper modulation/demodulation scheme. Once the instructions are received, the proper commands are forwarded through a dual-port RAM interface to the modulator 50 and demodulator 42.

A convolution encoder 54 receives signals from the SBMCP 48 to be transmitted to the SBRE 4. The convolutional encoder 54 encodes and interleaves the data signal before modulation. The encoder 54 is implemented as a part of the same processor as the modulator 50 and is substantially software driven. Data is received by the encoder 54 from the SBMCP 48 and convolutionally coded by the software of the control processor. Next, the encoded information is interleaved to randomize potential burst errors and allow the convolutionally coded signal to function in an uncorrelated error environment. The randomization process is software driven using a look-up table where the index of the table corresponds to the current position of a code and the contents of the index position in the table contains the permuted position of the code in a buffer.

Figure 10:
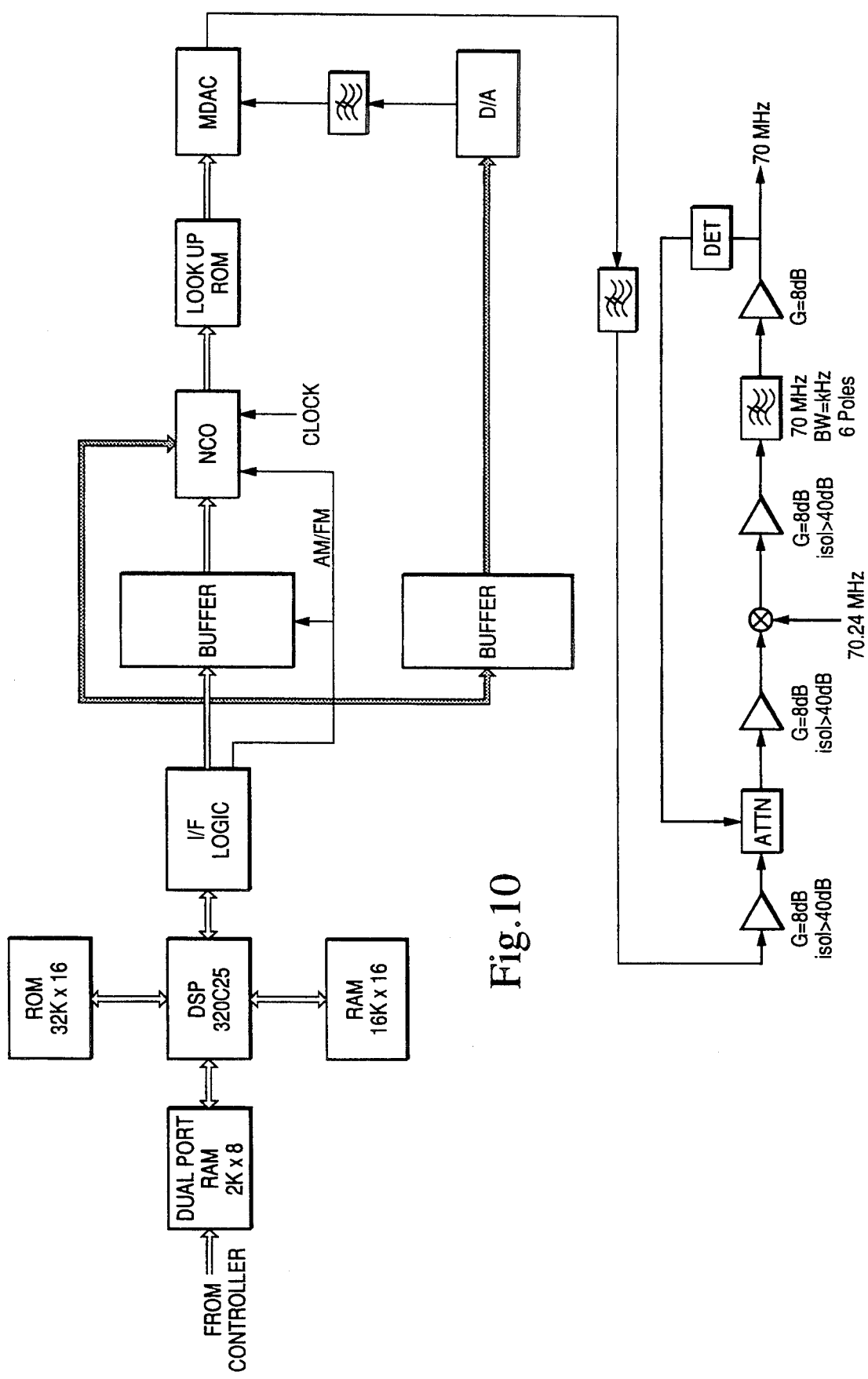
FIG. 10 is a block diagram illustrating the modulator of the single board modem.

Referring now to FIGS. 3 and 10, the modulator 50 design is similar to the demodulator 42 and is flexible with respect to the type of modulation and signal rates it is capable of generating. The modulator 50 utilizes a TMS 320C25 digital signal processor and controlling software to accomplish varying types of pulse shift key and frequency shift key modulations. The TMS 320C25 digital signal processor also operates to convolutionally encode and interleave the transmitted signal prior to modulation. Once modulated and encoded the signal is converted to analog by a D/A converter and amplified for transmission to the SBRE 4.

The modulator control processor modulates the signal by generating the digital modulation phase and frequency data necessary for modulation and integrates these words with the transmission signal. The modulator control processor calculates the desired modulating phase signal data input based on the desired output received from the SBMCP 48 and provides the data along with the frequency control data to the processor necessary to achieve this output. To generate phase modulated signals, the processor provides controller phase trajectory data to the modulator processor.

The output of the modulator processor is additionally converted from the phase domain to the time-frequency domain using a ROM. The ROM provides a look-up table for converting different phase steps to specific frequency time output levels. After modulation, the signal is amplified to a 70 MHz IF frequency for transmission to the SBRE.

A frequency generator 56 generates frequency signals for the proper down conversion and up conversion of signals within the single board modulator SBM 6. The frequency generator 56 interacts with most components of the SBM 6 to carry out this function.

Referring to FIG. 1, the system control processor 8 (SCP) is a commercially available product and provides system level control. Most of the functions of the system control processor 8 are associated with managing the front panel interfaces and communicating configuration and mode information to the SBM 6 and SBRE 4. The SCP 8 controls all switch group functions and network functions of the system. The SCP 8 consists of a commercial off-the-shelf single board computer such as from Tadpole Technology, model TP32V. The SCP 8 application software provides overall control of the unit and accepts operator commands through a front keyboard panel or a remote workstation. Status and control prompts are presented to the operator using menus on a display panel. The SCP software also controls most of the external digital interfaces used for user communications. In addition to its system initialization responsibilities, the SCP 8 controls the assignment of operating modes, channel frequencies and data rates to the SBM 6 and SBRE 4. The functional operation and status of all components of the transceiver are monitored through periodic message exchanges between the SCP 8 and other processors of the system. This includes initiating and reporting unit level self-test activities based on external commands. Thus, failure of system units are detected by the SCP 8 and other units of the system are notified and reconfigured by the SCP 8 to compensate for the failed unit.

Figure 4:
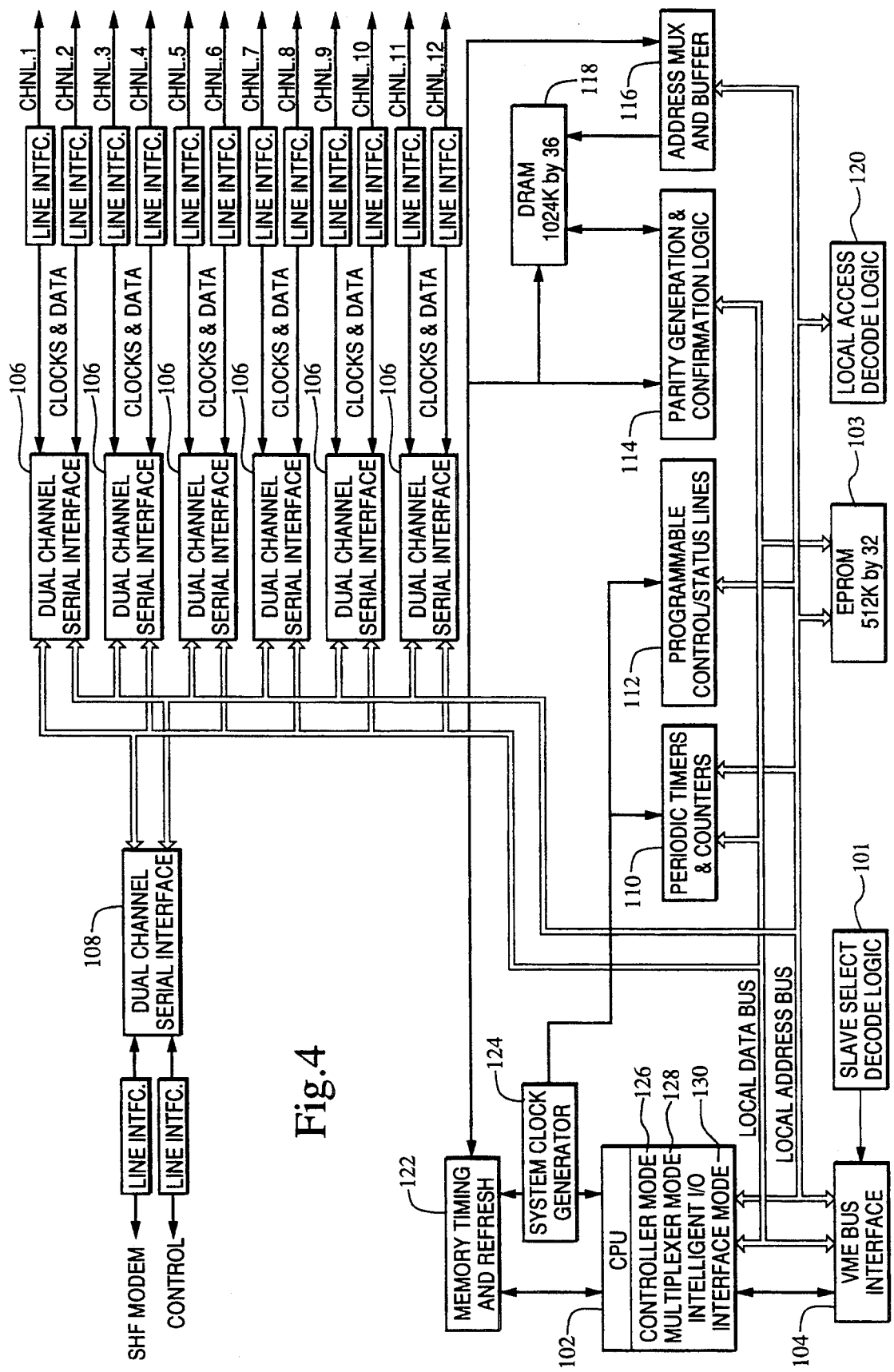
FIG. 4 is a block diagram illustrating the structure of the single board processor and multiplexer.

Referring now to FIG. 4, there is shown a single board processor multiplexer (SBPM). The SBPM is a single board VME module which interfaces baseband digital signals and provides multiplexing/demultiplexing for either SHF, UHF, or HF equipment or baseband digital processors. The SBPM is contained on a single 9 U VME module. The unit shall be substantially software controlled permitting the unit to operate at one of the variety of multiplexing schemes, control formats and data processing rates.

The software configuration of the SBPM allows the unit to operate in three separate modes depending upon the needs of the of the communications system. These modes include the multiplexer mode 126, controller mode 128 and intelligent input/output interface mode 130. The multiplexer mode 126 allows software derived multiplexing or demultiplexing of digital baseband signals of less than 100 KBPS into/from composite signals of less than or equal to 256 KBPS. The multiplexer mode 126 processing includes the order wire or channel control required to perform multiplexing and demultiplexing processes. The SBPM also operates in a controller mode 128 capable of performing complex communications protocol such as packet switching, TVMA, system control or network control using the appropriate software and available processing hardware. Finally, the SBPM can operate in an intelligent input/output interface mode 130 in which the SBPM provides interface processing to multiple serial interfaces.

The software controlling the operational mode of the SBPM is controlled by a central processing unit 102. The central processing unit 102 consists of an MC68030 microprocessor unit programmable over the VME bus interface 104. The central processing unit 102 processes the control and formatting requirements of the different modes of operation.

The multiplexing/demultiplexing or input/output operations occur over six dual channel serial interfaces 106. The interfaces 106 operating from 2 to 12 input/output channels for receiving data. Data input or output over the dual channel serial interfaces 106 occurs over another dual channel interface 108 connected to an input/output modem and control line.

The periodic timers and counters 110 allow for synchronous control of data and address transmissions over the dual channel serial interfaces 106 and 108. The programmable control status lines 112 control which serial interfaces are presently operational and notify the central processing unit 102 of the present status of the serial interfaces 106 and 108. The parity generation and confirmation and logic 114 generates parity bids and confirms transmission of data over the local data bus. The address multiplexer and buffer 116 allow local addressing of specific dual channel interfaces 106 and 108.

Data, transmitted or received over the serial interfaces 106 or the VME interface 104, is locally stored at a 1024K by 36 dynamic random access memory (DRAM) 118. A 512k by 32 EPROM 103 allows for temporary storage of operating mode instructions. Finally, local timing and clock functions are carried out by the memory timing and refresh 122 and the system clock generator 124.

Although a preferred embodiment of the invention has been illustrated in the accompanying drawings and described in the foregoing Detailed Description, it will be understood that the invention is not limited to the embodiment disclosed, but is capable of numerous rearrangements and modifications of parts and elements without departing from the spirit of the invention.

We claim:

1. An RF communication system comprising:
   an open architecture bus line;
   a system control processor removably interfaced with the open architecture bus line for generating programming commands to select a frequency range, modulation scheme and data rate for the RF communication system;
   a receiver exciter removably interfaced with the open architecture bus line for receiving and transmitting RF signals, said receiver exciter further including means for programming the receiver exciter for operating at a selected one of a plurality of frequency ranges; and
   a modem removably interfaced with the open architecture bus line for modulating/demodulating and for encoding/decoding RF signals, said modem including means for programming the modem to operate at a selected one of a plurality of modulation schemes and at a selected one of a plurality of data rates.

2. The RF communication system of claim 1, wherein said means for programming the receiver exciter includes a control processor for generating control commands in response to commands received over the open architecture bus line.

3. The RF communication system of claim 2, wherein said receiver exciter further comprises:
   a preselector responsive to the control commands from the control processor for filtering an input frequency received signal at the selected operating frequency;
   a synthesizer responsive to the control commands from the control processor for generating a selected mixing signal for mixing with the input frequency received signal to generate an intermediate frequency received signal and for mixing with an intermediate frequency transmitted signal to generate an output frequency transmitted signal;
   a receiver converter for mixing the input frequency received signal with the selected mixing signal to produce the intermediate frequency received signal;
   a transmitter converter for mixing the intermediate frequency transmitted signal with the selected mixing signal to produce an output frequency transmitted signal; and
   an exciter/amplifier responsive to the control commands from the control processor for filtering and amplifying the output frequency transmitted signal from the transmitter converter at the selected operating frequency.

4. The RF communication system of claim 3, wherein said preselector further comprises means for selectively filtering the input frequency received signal in response to control commands from the control processor.

5. The RF communication system of claim 3, wherein said exciter/amplifier further comprises means for selectively filtering the output frequency transmitted signal in response to control commands from the control processor.

6. The RF communication system of claim 2, wherein said receiver exciter includes a synthesizer responsive to the control commands from the control processor for generating a selected mixing signal for mixing with an input frequency received signal to generate an intermediate frequency received signal and for mixing with an intermediate frequency transmitted signal to generate an output frequency transmitted signal.

7. The RF communication system of claim 6, wherein said receiver exciter includes a receiver converter for mixing an input frequency received signal with the selected mixing signal to produce a selected intermediate frequency received signal.

8. The RF communication system of claim 6, wherein the receiver exciter includes a transmitter converter for mixing an intermediate frequency transmitted signal with the selected mixing signal to produce an output frequency transmitted signal.

9. The RF communication system of claim 1, wherein the means for programming the modem includes a control processor for generating control commands and processing intermediate frequency transmitted and received signals in response to commands received over the open architecture bus line.

10. The RF communication system of claim 9, wherein the modem includes:
    programmable means responsive to the control commands from the control processor for decoding and deinterleaving an intermediate frequency received signals; and
    programmable means responsive to the control commands from the control processor for encoding and interleaving an intermediate frequency transmitted signal.

11. The RF communications system of claim 10, further including a frequency synthesizer responsive to control commands from the control processor for generating selected injection frequencies to implement the selected modulation scheme.

12. The RF communications system of claim 10, further including a timing means for assisting the control processor in processing the intermediate frequency received signals.

13. The RF communication system of claim 10, wherein the modem comprises:
    an IF and noise blanker for filtering and blocking unwanted noise and spurious signals from an intermediate frequency received signal;
    means responsive to the control commands from the control processor for demodulating the intermediate frequencies received signal in accordance with the selected modulation scheme and the selected data rate;
    programmable means responsive to the control commands from the control processor for decoding and deinterleaving the intermediate frequency received signal;
    programmable means responsive to the control commands from the control processor for encoding and interleaving an intermediate frequency transmitted signal; and
    means responsive to the control commands from the control processor for modulating the intermediate frequency transmitted signal in accordance with the selected modulation scheme and the selected data rate.

14. The RF communication system of claim 13, wherein said programmable means for decoding and deinterleaving further includes means for implementing a Viterbi convolutional decoding algorithm.

15. The RF communication system of claim 13, further including a linear demodulator for audio signal demodulation.

16. The RF communication system of claim 9, wherein the modem further includes:
    means responsive to the control commands from the control processor for demodulating the intermediate frequency received signal in accordance with the selected modulation scheme and the selected data rate; and
    means responsive to the control commands from the control processor for modulating the intermediate frequency transmitted signal in accordance with the selected modulation scheme and the selected data rate.

17. The RF communication system of claim 2, wherein said control processor further comprises means for determining the selected mixing signal required to generate an intermediate frequency received signal when mixed with the input frequency received signal and to generate the output frequency transmitted signal when mixed with the intermediate frequency transmitted signal.

18. The RF communication system of claim 2, wherein the receiver exciter includes an exciter amplifier responsive to the control commands from the control processor for filtering and amplifying an output frequency transmitted signal at the selected operating frequency.

19. The RF communication system of claim 2, wherein said receiver exciter includes a preselector responsive to the control commands from the control processor for selectively filtering an input frequency received signal.

20. The RF communications system of claim 1, further including a processor/multiplexer for operating in a plurality of data transmission and processing modes.

* * * * *